(12) United States Patent
Yasui et al.

(10) Patent No.: US 11,619,639 B2
(45) Date of Patent: Apr. 4, 2023

(54) AUTOMATED ANALYZER

(71) Applicant: Hitachi High-Technologies Corporation, Tokyo (JP)

(72) Inventors: Akihiro Yasui, Tokyo (JP); Tatsuya Fukugaki, Tokyo (JP); Masashi Akutsu, Tokyo (JP); Naoto Suzuki, Tokyo (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 16/646,465

(22) PCT Filed: Aug. 23, 2018

(86) PCT No.: PCT/JP2018/031123
§ 371 (c)(1),
(2) Date: Mar. 11, 2020

(87) PCT Pub. No.: WO2019/073700
PCT Pub. Date: Apr. 18, 2019

(65) Prior Publication Data
US 2020/0292566 A1    Sep. 17, 2020

(30) Foreign Application Priority Data
Oct. 12, 2017 (JP) .............................. JP2017-198333

(51) Int. Cl.
*G01N 35/00* (2006.01)
*G01N 35/02* (2006.01)
(Continued)

(52) U.S. Cl.
CPC ..... *G01N 35/00584* (2013.01); *G01N 35/025* (2013.01); *G01N 35/04* (2013.01);
(Continued)

(58) Field of Classification Search
CPC ............. G01N 35/00584; G01N 35/04; G01N 35/1002; G01N 35/1016;
(Continued)

(56) References Cited

U.S. PATENT DOCUMENTS 6,197,255 B1    3/2001 Miyake et al.
9,933,447 B2    4/2018 Takayama et al.
(Continued)

FOREIGN PATENT DOCUMENTS

JP    52-92773 A    8/1977
JP    59-24380 B2   6/1984
(Continued)

OTHER PUBLICATIONS

International Preliminary Report on Patentability (PCT/IPEA/409) issued in PCT Application No. PCT/JP2018/031123 dated Aug. 29, 2019 with English Translation (seven (7) pages).
(Continued)

*Primary Examiner* — Benjamin R Whatley
(74) *Attorney, Agent, or Firm* — Crowell & Moring LLP

(57) ABSTRACT

The present invention reduces the turnaround time of an automated analyzer. During a period when cyclic measurement by a measurement unit is unnecessary, a controller washes a reaction vessel using a washing cycle having a cycle time shorter than that of an analysis cycle. A single analysis cycle and a single washing cycle both include a reaction disc stopping period and rotation period. In the washing cycle, there is no time during the stopping period when a sample dispensing mechanism, reagent dispensing mechanism, or stirring mechanism operates but there is a time when a washing mechanism operates. The washing cycle stopping period is shorter than the analysis cycle stopping period. The amount of rotation of the reaction disk in the analysis cycle rotation period is the same as the
(Continued)

amount of rotation of the reaction disk in the washing cycle rotation period.

14 Claims, 10 Drawing Sheets

(51) Int. Cl.
*G01N 35/04* (2006.01)
*G01N 35/10* (2006.01)

(52) U.S. Cl.
CPC ..... *G01N 35/1002* (2013.01); *G01N 35/1016* (2013.01); *G01N 2035/00534* (2013.01); *G01N 2035/0437* (2013.01); *G01N 2035/0444* (2013.01)

(58) Field of Classification Search
CPC . G01N 2035/00534; G01N 2035/0437; G01N 2035/0444
See application file for complete search history.

(56) References Cited

U.S. PATENT DOCUMENTS

| | | | |
|---|---|---|---|
| 2007/0020145 A1 | 1/2007 | Oonuma | |
| 2016/0061852 A1* | 3/2016 | Takayama | G01N 35/0092 134/56 R |

FOREIGN PATENT DOCUMENTS

| | | |
|---|---|---|
| JP | 63-180838 A | 7/1988 |
| JP | 5-164763 A | 6/1993 |
| JP | 6-308132 A | 11/1994 |
| JP | 8-338847 A | 12/1996 |
| JP | 2000-97948 A | 4/2000 |
| JP | 2007-24804 A | 2/2007 |
| WO | WO 2014/171346 A1 | 10/2014 |

OTHER PUBLICATIONS

Supplementary European Search Report issued in European Application No. 18867171.3 dated Jun. 9, 2021 (eight (9) pages).
International Search Report (PCT/ISA/210) issued in PCT Application No. PCT/JP2018/031123 dated Oct. 16, 2018 with English translation (four (4) pages).
Japanese-language Written Opinion (PCT/ISA/237) issued in PCT Application No. PCT/JP2018/031123 dated Oct. 16, 2018 (six (6) pages).

* cited by examiner

[FIG. 1]
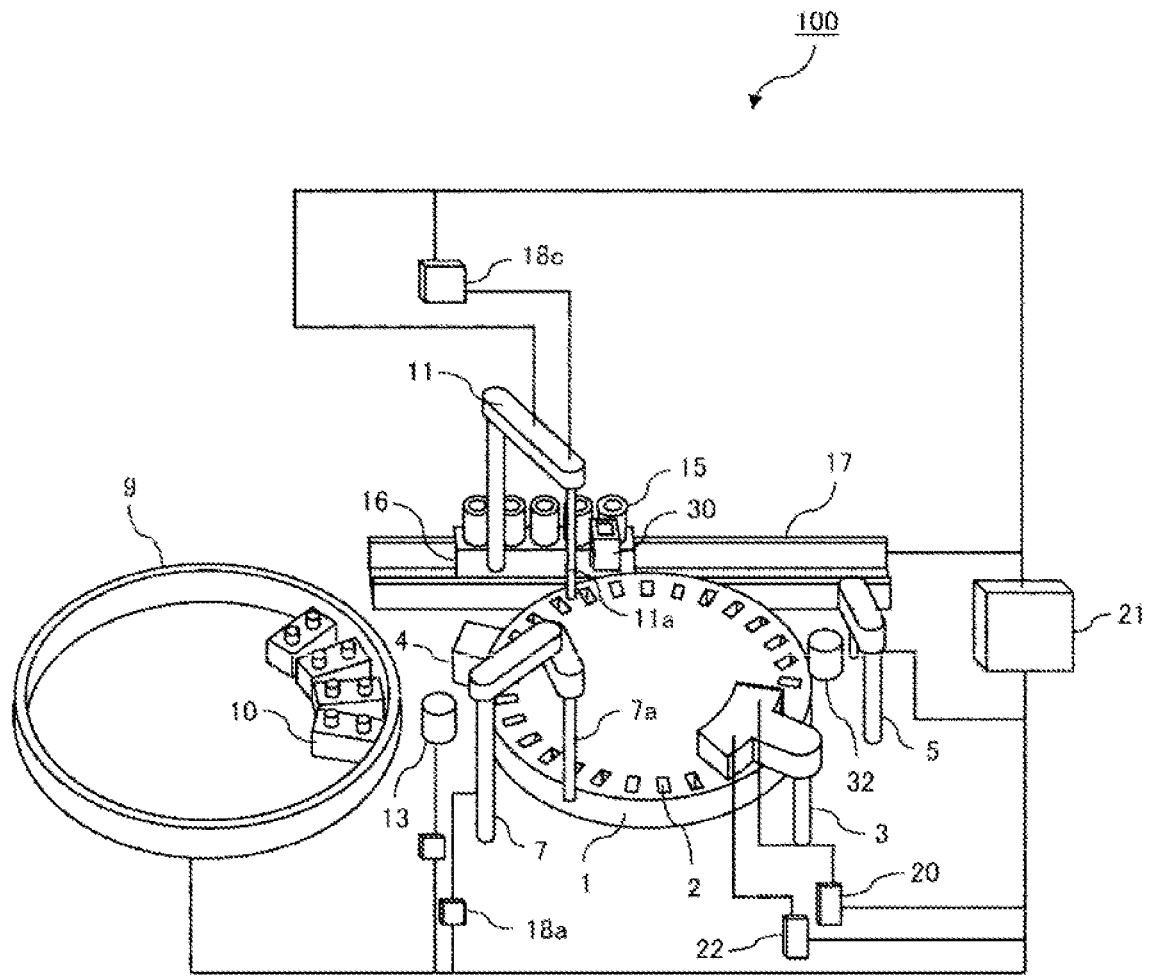

[FIG. 2A]
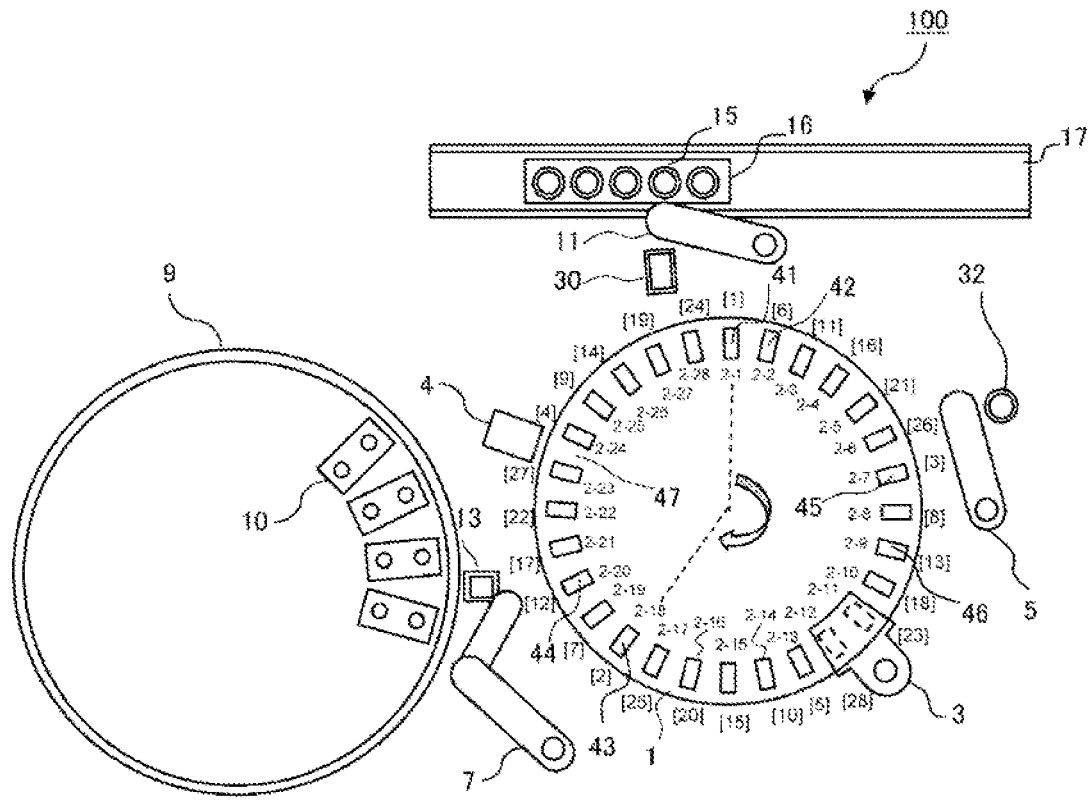
[FIG. 2B]
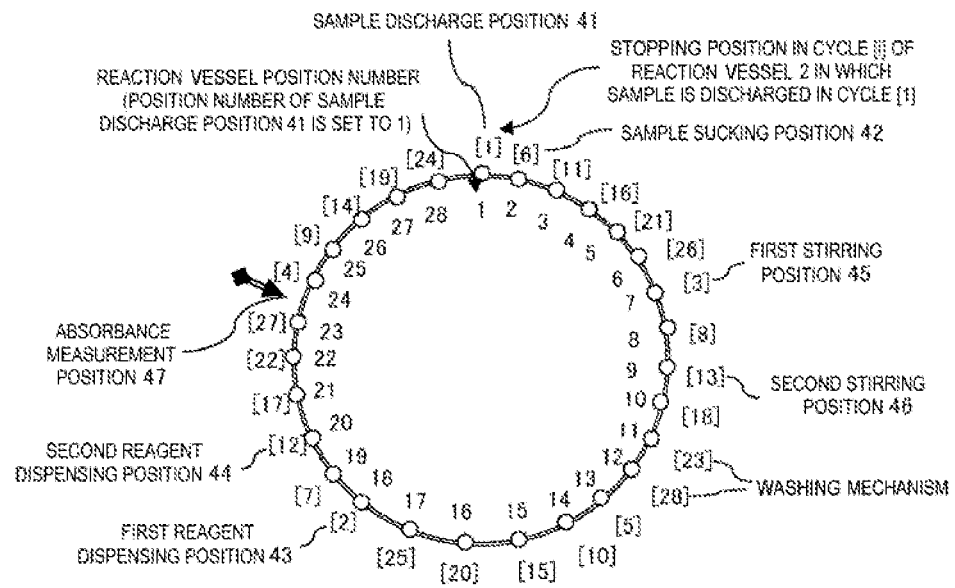

[FIG. 3]
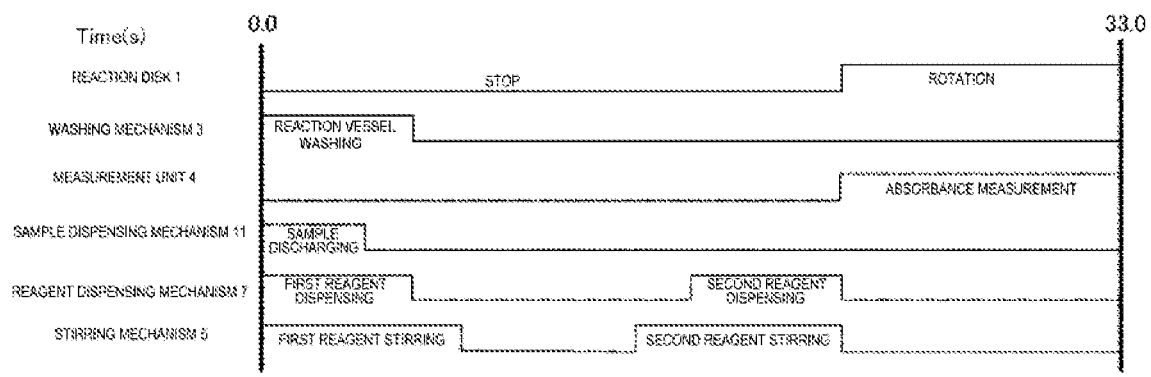

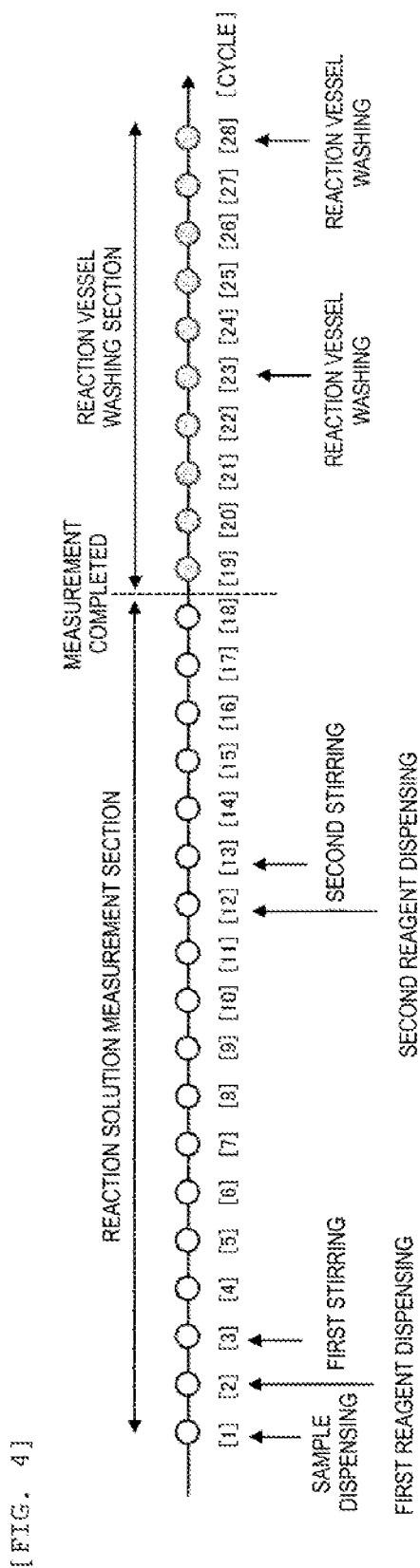
[FIG. 4]

[FIG. 5]
(A) ANALYSIS CYCLE 501
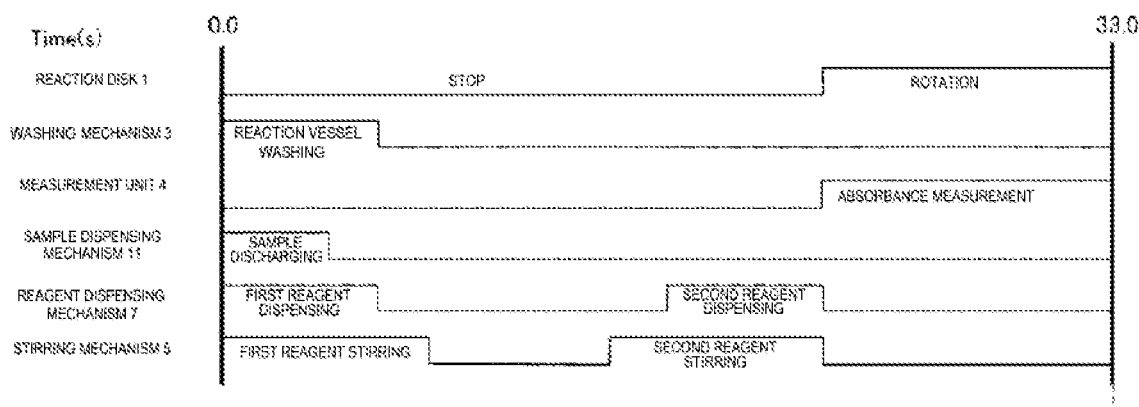
(B) ANALYSIS CYCLE (ONLY WASHING OPERATION) 502
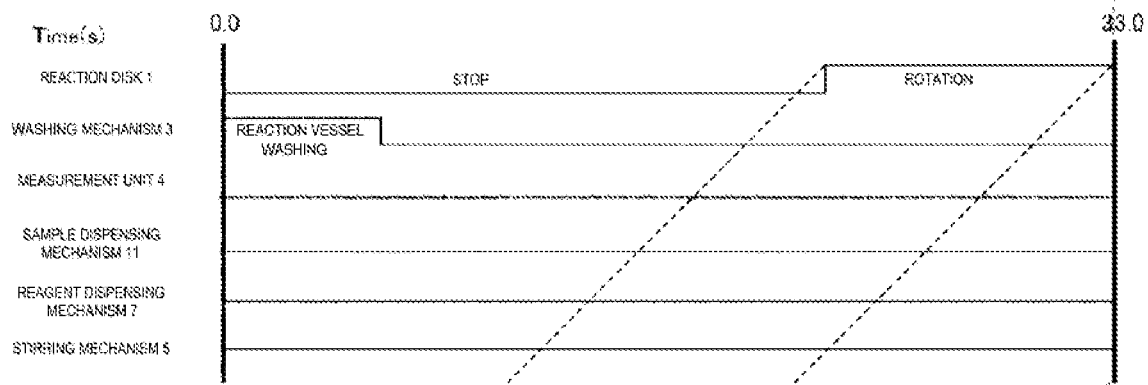
(C) WASHING CYCLE 503
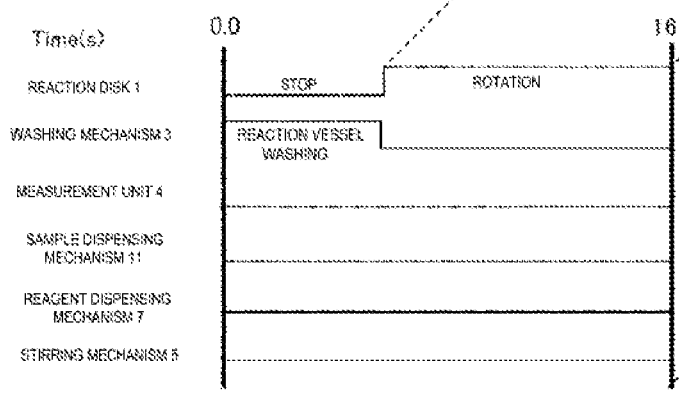

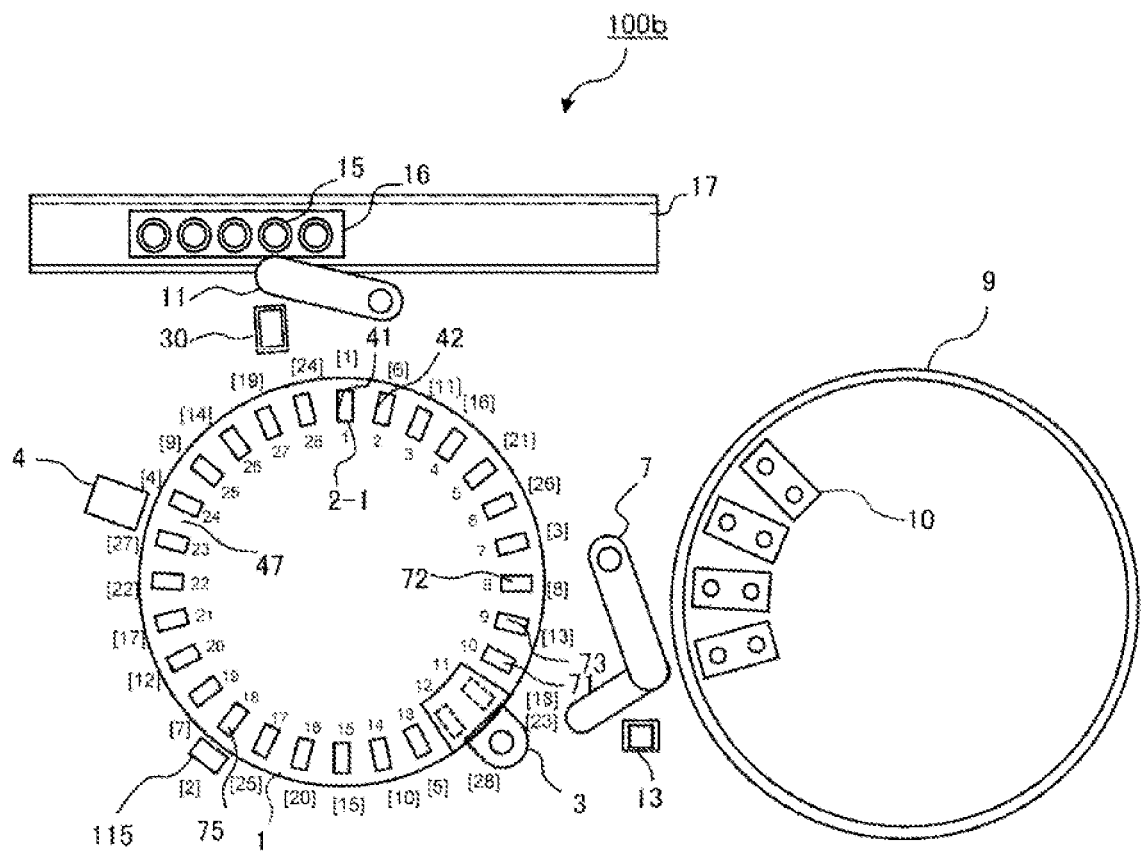

[FIG. 7]

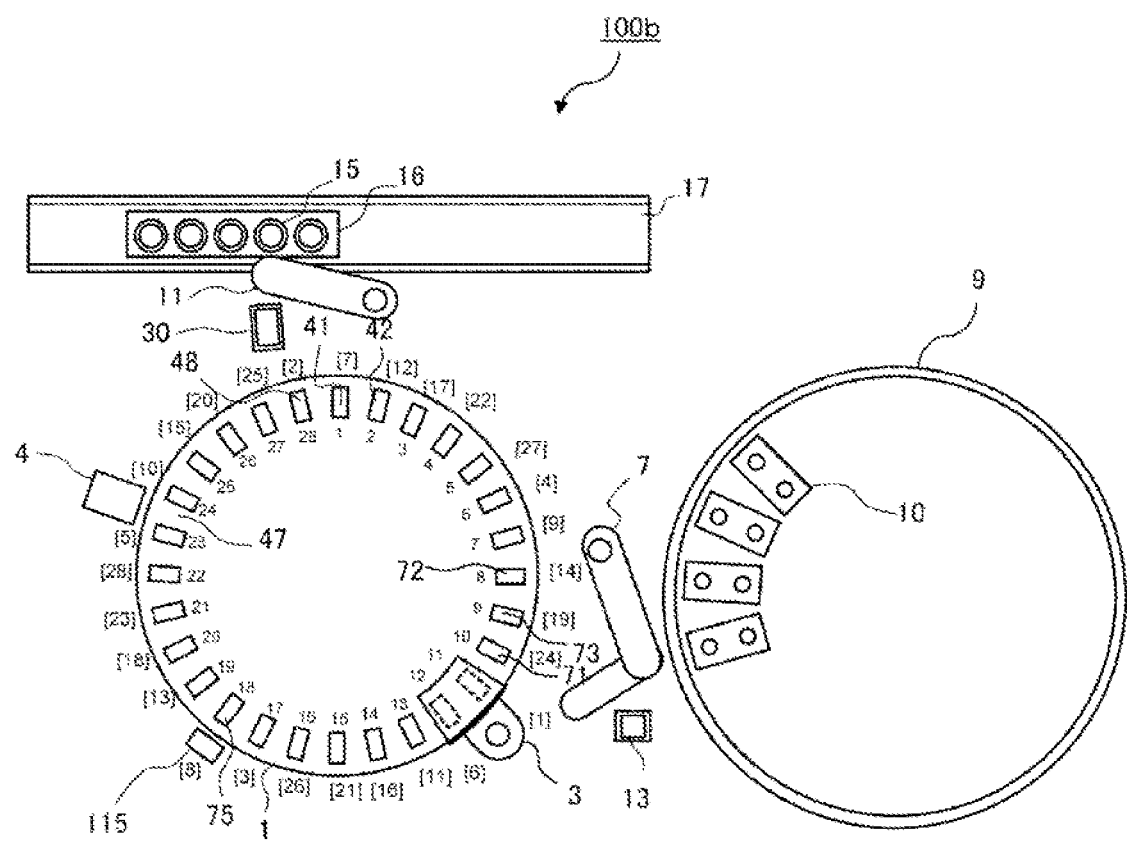
[FIG. 8]

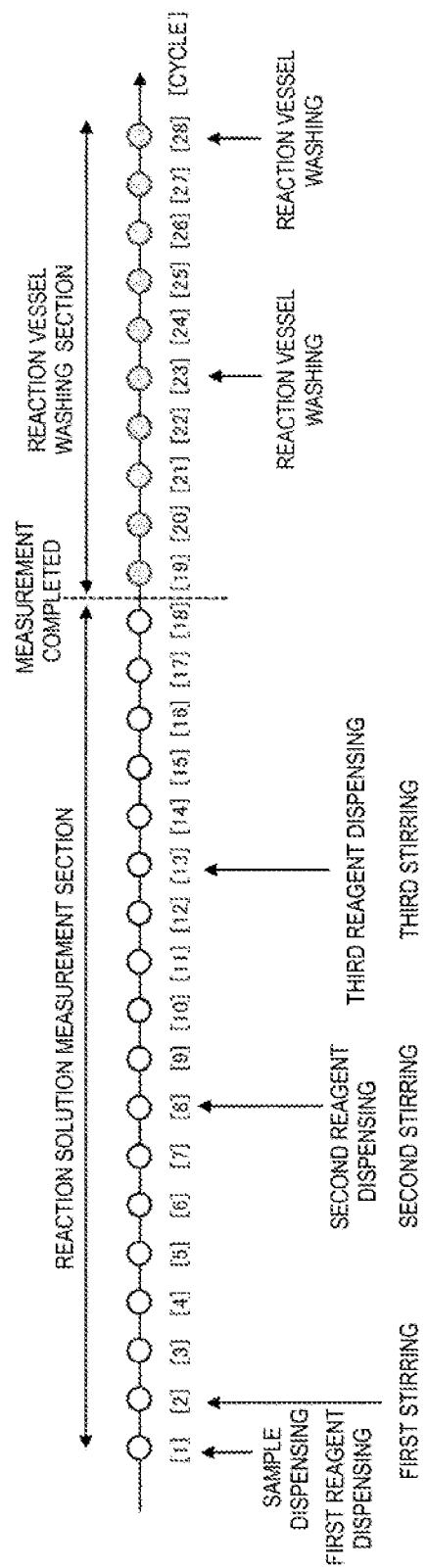
[FIG. 9]

[FIG. 10]
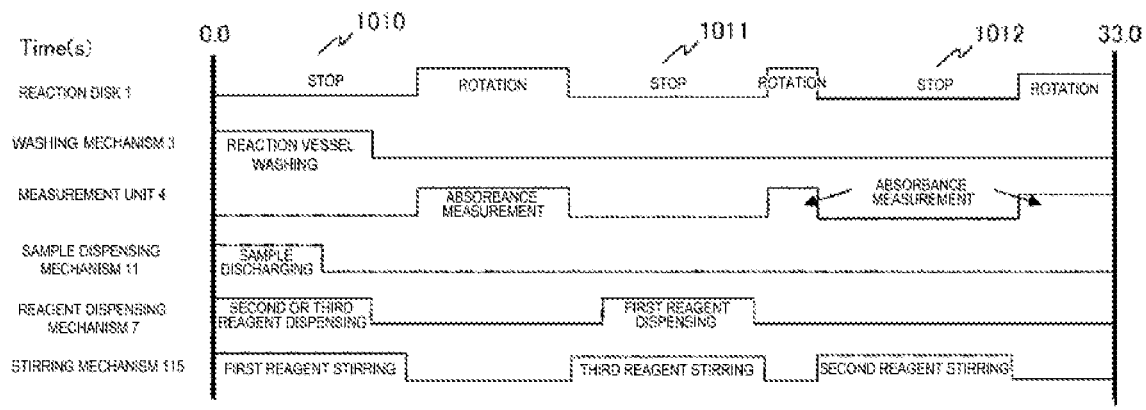
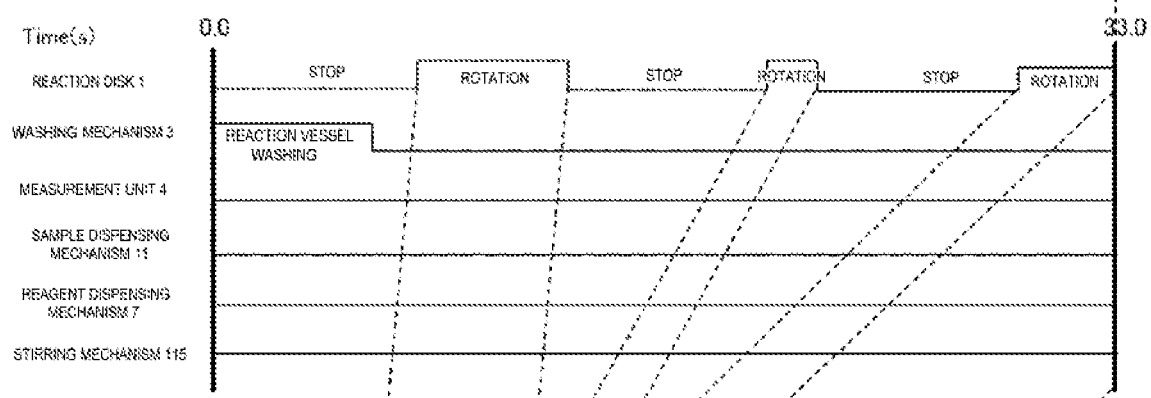
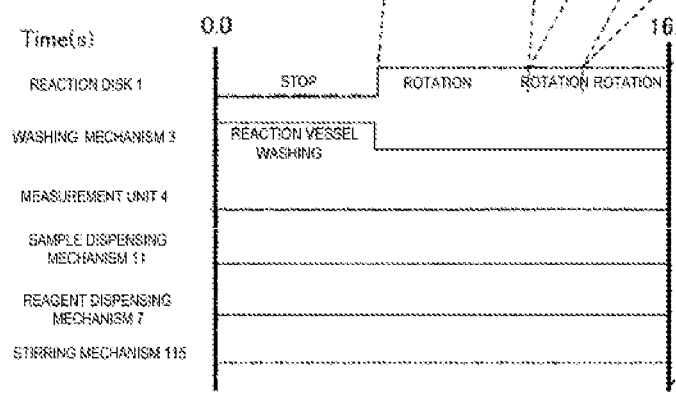

AUTOMATED ANALYZER

TECHNICAL FIELD

The present invention relates to an automated analyzer that reduces a turnaround time (TAT) for analyzing a biological sample such as blood and urine.

BACKGROUND ART

The automated analyzer that performs a quantitative or qualitative analysis of a specific component included in the biological sample such as blood and urine is essential for the present diagnosis due to reproducibility of an analysis result, a high processing speed, and the like.

A measurement method to be performed by the automated analyzer is roughly classified into an analysis method (colorimetric analysis) using a reagent which reacts with an analysis target component in the sample to change a color of a reaction solution, and an analysis method (immune analysis) of counting markers by using a reagent in which the markers are added to a substance to be bound specifically with the target component directly or indirectly.

Generally, the automated analyzer that performs the colorimetric analysis is configured to repeat rotation and stop of a plurality of reaction vessels arranged in an annular shape on a rotatable disk, and to continuously and cyclically analyze a reaction between the biological sample such as blood and urine and the reagent.

A definition of a cycle time in the automated analyzer generally refers to a time from when the measurement sample is dispensed into one reaction vessel to when the sample is dispensed into a next reaction vessel. In one cycle, the automated analyzer adds the reagent, stirs the sample and the reagent, measures the reaction solution, and washes the reaction vessel after completion of the measurement in addition to dispensing the sample.

For example, in PTL 1, 46 reaction vessels are arranged at equal intervals on a turntable, and are controlled so as to rotate by an amount of one rotation+one reaction vessel in one cycle. At this time, a time of one cycle is 30 seconds, and a time required for the rotation is 23 seconds. Therefore, a device performs operations such as dispensing the measurement sample and the reagent, cleaning the reaction vessel after completion of the measurement during seven seconds when the turntable is stopped. Thereafter, the device rotates the turntable by the amount of one rotation+one reaction vessel over 23 seconds, and an absorbance measurement is performed with a photometer arranged across a circumferential orbit of the reaction vessel. That is, in the present device, when the reaction vessel is focused on, the reaction vessel is shifted in a counterclockwise direction by an amount of one reaction vessel everyone cycle while the absorbance measurement is performed once every 30 seconds, and after 46 cycles, the reaction vessel after completion of the measurement and the cleaning returns to a position where an original sample can be dispensed. In the automated analyzer, in order to wash and reuse the reaction vessel used for the analysis, a total of three places including two drain nozzles and one cleaning nozzle, that is, three cycles=1 minute and 30 seconds are used.

In PTL 2, by a combination of a plurality of discharge nozzles for discharging cleaning water and detergent to the washing mechanism and a plurality of suction nozzles for sucking the reaction solution, the cleaning water, and the detergent, the reaction vessel is cleaned using a total of nine places, that is, nine cycles.

PTL 3 discloses that a preset reaction vessel cleaning is automatically performed when a device power supply is turned on.

PTL 4 discloses that in a biochemical automated analyzer, in order to be able to freely set a photometric time of a reaction detection tube and to increase a degree of freedom of a device configuration to perform an optimal arrangement, when the number of reaction detection tubes arranged circumferentially is set to N and the number of reaction detection tubes to be moved in one analysis cycle is set to M, $N\pm 1=\gamma \times M$ ($\gamma$ is an integer equal to or greater than 2), or when there is no common factor other than 1 between N and M and $M<N/2$, the analysis is performed by moving the reaction detection tubes repeatedly and sequentially using all the reaction detection tubes.

CITATION LIST

Patent Literature

PTL 1: JP-B-59-24380
PTL 2: WO 2014/171346
PTL 3: JP-A-8-338847
PTL 4: JP-A-5-164763

SUMMARY OF INVENTION

Technical Problem

In the automated analyzer in recent years, at the time of reusing the reaction vessel, in order to avoid erroneous measurement due to carry-over of a previously measured sample or the reagent, in addition to cleaning with the cleaning water, the reaction vessel generally requires more cleaning steps such as cleaning using a detergent containing alkali, acid, or the like, cleaning by the cleaning water of the used detergent to perform careful water droplet removal, and the like. For example, in PTL 2, there are nine cleaning steps as described above.

Generally, after the measurement of the reaction solution is completed, the automated analyzer washes the reaction vessel to complete an analysis operation, and transitions to standby. Therefore, when a next analysis is started, all the reaction vessels are in a cleaned state. However, for example, when an operator accesses the analyzer due to addition of an analysis reagent or the like, or since dust or the like in air may be mixed as a foreign substance into the cleaned reaction vessel resulting in a measurement result failure, actually, when the analysis is started in the automated analyzer, it is common to perform the cleaning again by the washing mechanism in order from the reaction vessel in which the sample measurement is to be performed first, and then use the reaction vessel for the analysis.

Therefore, according to the automated analyzer described in PTL 1, it is necessary to perform the cleaning operation of the reaction vessel which is used for the analysis first using 3 cycles=1 minute 30 seconds from a start of the analysis. If there are nine cleaning steps as in the automated analyzer described in PTL 2, a loss time increases. In addition, when all the reaction vessels are cleaned as in the automated analyzer described in PTL 3, a time from when the analysis is started to when the measurement of the sample is actually started is further increased.

The more thoroughly the reaction vessel is cleaned to prevent the carry-over, the longer the time required for the cleaning is, whereas there is still other factors that prolong the time required for the cleaning. As in any one of the automated analyzers described in PTLs 1 to 4, it is common that the washing mechanism is disposed at only one place in the vicinity of the reaction disk and the reaction vessels to be cleaned by the washing mechanism are located close to each other. According to the automated analyzer in PTL 1, since the turntable is rotated by the amount of one rotation+ one reaction vessel in one cycle, one reaction vessel is shifted by the amount of one reaction vessel in one cycle. Therefore, if there are three cleaning steps, the cleaning of the reaction vessel is completed in three cycles. On the other hand, in the automated analyzer of PTL 4, since the reaction vessel is shifted by the amount of one reaction vessel, γ cycles are required. That is, even when the same cleaning is performed, the automated analyzer of PTL 4 requires a time of γ times of the automated analyzer of PTL 1 even if other conditions are the same.

The invention is to provide an automated analyzer capable of reducing TAT by reducing a time related to reaction vessel cleaning.

Solution to Problem

An automated analyzer includes a reaction disk configured to circumferentially accommodate a plurality of reaction vessels, a sample dispensing mechanism configured to dispense a predetermined amount of a sample into the reaction vessel, a reagent dispensing mechanism configured to dispense a predetermined amount of a reagent into the reaction vessel, a stirring mechanism configured to stir the sample and the reagent dispensed into the reaction vessel, a measurement unit configured to measure a mixture of the sample and the reagent in the reaction vessel in a reaction process and/or a reaction solution after the reaction, a washing mechanism configured to wash the reaction vessel, and a controller. In a period when cyclic measurement by the measurement unit is not necessary, the controller is configured to control the washing mechanism to perform cleaning of the reaction vessel in a washing cycle having a cycle time shorter than that of an analysis cycle. The analysis cycle and the washing cycle each include a stopping period and a rotation period of the reaction disk in one cycle. In the analysis cycle, all of the sample dispensing mechanism, the reagent dispensing mechanism, the stirring mechanism, and the washing mechanism each have a time to operate in the stopping period, and the measurement unit is configured to perform a measurement in the rotation period. In the washing cycle, any one of the sample dispensing mechanism, the reagent dispensing mechanism, and the stirring mechanism does not have a time to operate, and the washing mechanism has a time to operate in the stopping period, and a stopping period of the washing cycle is shorter than the stopping period of the analysis cycle. A rotation amount of the reaction disk in the rotation period of the analysis cycle is equal to a rotation amount of the reaction disk in the rotation period of the washing cycle.

Advantageous Effect

According to the invention, it is possible to reduce TAT of the device by shortening a cleaning time before and after the analysis and a cleaning time in maintenance.

Problems to be solved, configurations and effects other than those described above will be clarified by description of the following embodiments.

BRIEF DESCRIPTION OF DRAWINGS

FIG. 1 is an overall schematic configuration diagram of an automated analyzer.

FIG. 2A is a diagram showing an arrangement of a plurality of reaction vessels accommodated in a reaction disk.

FIG. 2B is a diagram showing an arrangement of the plurality of reaction vessels accommodated in the reaction disk.

FIG. 3 is a diagram showing an analysis timing chart in an automated analyzer of a first embodiment.

FIG. 4 is a diagram showing an analysis step in the automated analyzer of the first embodiment.

FIG. 5 is a diagram showing an analysis and cleaning timing chart in the automated analyzer of the first embodiment.

FIG. 6 is a diagram showing an arrangement of a plurality of reaction vessels accommodated in a reaction disk of a second embodiment.

FIG. 7 is a diagram showing an arrangement of the plurality of reaction vessels accommodated in the reaction disk of the second embodiment.

FIG. 8 is a diagram showing an arrangement of the plurality of reaction vessels accommodated in the reaction disk of the second embodiment.

FIG. 9 is a diagram showing an analysis step in the automated analyzer of the second embodiment.

FIG. 10 is a diagram showing an analysis and cleaning timing chart in the automated analyzer of the second embodiment.

DESCRIPTION OF EMBODIMENTS

FIG. 1 is an overall schematic configuration diagram of an automated analyzer according to an embodiment. An automated analyzer 100 mainly includes a rack 16 for mounting a plurality of sample vessels 15 for storing a sample, a sample transport mechanism 17 for transporting the rack 16 to a desired position, a reaction disk 1 for accommodating a plurality of reaction vessels 2 at a predetermined interval along a circumferential direction (circumferentially), a reagent disk 9 for accommodating a plurality of reagent bottles 10, for storing various reagents, along the circumferential direction (circumferentially), a sample dispensing mechanism 11 for dispensing a predetermined amount of sample in the sample vessel 15 to the reaction vessel 2, a reagent dispensing mechanism 7 for dispensing a predetermined amount of reagent in the reagent bottle 10 to the reaction vessel 2, a stirring mechanism 5 for stirring and mixing the dispensed sample and reagent in the reaction vessel 2, a measurement unit 4 for measuring a mixture of the sample and the reagent in the reaction vessel 2 in a reaction process and/or a reaction solution after the reaction, a washing mechanism 3 for cleaning the reaction vessel 2 after the measurement is completed, and a controller 21 for controlling operations of the above components.

In addition, the reagent dispensing mechanism 7 provided between the reaction disk 1 and the reagent disk 9 includes a reagent nozzle 7a, and a reagent pump 18a is connected to the reagent nozzle 7a. Herein, for example, a syringe pump is used as the reagent pump 18a. The sample dispensing mechanism 11 provided between the reaction disk 1 and the sample transport mechanism 17, capable of rotating in an arc shape, and moving up and down includes a sample nozzle 11a. A sample pump 18c is connected to the sample nozzle 11a. The sample nozzle 11a moves while drawing an arc around a rotation axis of the sample dispensing mechanism 11, sucks the sample from the sample vessel 15 or the reaction vessel 2, and discharges the sample to another reaction vessel 2 in the reaction disk 1 to dispense the sample. Herein, for example, a syringe pump is used as the sample pump 18c.

The measurement unit 4 includes a light source (not shown) disposed on an inner side of the reaction disk 1 and a spectrophotometer disposed facing the light source so as to sandwich the reaction vessel 2, detects a transmitted light where an irradiation light emitted from the light source transmits through the reaction solution which is the mixture of the sample and the reagent in the reaction vessel 2, and measures absorbance. The measurement unit 4 is not limited to the spectrophotometer that measures the absorbance, and for example, a detector for detecting the transmitted light and scattered light may be used instead of the spectrophotometer.

The stirring mechanism 5 includes, for example, a stirring blade or a spatula-shaped rod (not shown) provided at a tip end thereof, and the stirring is performed by infiltrating the stirring blade or the spatula-shaped rod in the reaction solution in the reaction vessel 2 and rotating the stirring blade or the spatula-shaped rod.

A cleaning pump 20 and a vacuum pump 22 are connected to the washing mechanism 3. Further, a cleaning tank 13 for cleaning the reagent nozzle 7a of the reagent dispensing mechanism 7 is provided between the reaction disk 1 and the reagent disk 9. A cleaning tank 30 for cleaning the sample nozzle 11a of the sample dispensing mechanism 11 is provided between the reaction disk 1 and the sample transport mechanism 17, a cleaning tank 32 for cleaning the stirring blade or the spatula-shaped rod of the stirring mechanism 5 is provided between the reaction disk 1 and the stirring mechanism 5, and these cleaning tanks are provided to prevent contamination.

Hereinafter, as shown in FIG. 1, a case where the automated analyzer includes the rack 16 for mounting the plurality of sample vessels 15 for storing the sample and the sample transport mechanism 17 for transporting the rack 16 to the desired position is described as an example, but the invention is not limited thereto. For example, the plurality of sample vessels 15 may be accommodated along the circumferential direction (circumferentially) on a sample disk, or a sample disk for accommodating the plurality of the sample vessels 15 along the circumferential direction on an inner circumferential side and an outer peripheral side concentrically may be used.

First Embodiment

An arrangement of the plurality of reaction vessels accommodated in the reaction disk 1 of the automated analyzer 100 of the first embodiment will be described with reference to FIGS. 2A and 2B. As shown in FIG. 2A, in the automated analyzer 100, 28 reaction vessels 2-1 to 2-28 are accommodated so as to be spaced from one another at a predetermined interval along the circumferential direction of the reaction disk 1 (circumferentially). As shown by an arrow, the reaction disk 1 repeatedly rotates by an amount of 17 reaction vessels 2 and stops in one cycle in a clockwise direction. In the present specification, in a case where a specific reaction vessel accommodated in the reaction disk 1 is shown, any one of the reaction vessels 2-1 to 2-28 is shown, and in a case where an arbitrary reaction vessel is shown or the reaction vessels are collectively referred to, the reaction vessel is referred to as the reaction vessel 2. Further, one cycle is defined as a time from when the sample dispensing mechanism 11 dispenses the measurement sample from the sample vessel 15 to one reaction vessel 2 to when the reaction disk 1 rotates and stops and the sample is dispensed to the next reaction vessel 2. Therefore, in an example shown in FIG. 2A, since a position where the sample is dispensed from the sample vessel 15 to the reaction vessel 2 by the sample dispensing mechanism 11 is a sample discharge position 41, the measurement sample is dispensed from the sample vessel 15 by the sample dispensing mechanism 11 to the reaction vessel 2-1 in a first cycle, to the reaction vessel 2-12 (in a position away from the reaction vessel 2-1 in a counterclockwise direction by 17 reaction vessels) in a second cycle, to the reaction vessel 2-23 (in a position away from the reaction vessel 2-12 in a counterclockwise direction by 17 reaction vessels) in a third cycle.

The above operations are repeated, and the reaction vessel returns to an original position in 28 cycles. In the present embodiment, when the total number of the reaction vessels 2 accommodated in the reaction disk 1 is set to N and a rotation amount rotating in one cycle is set to an amount corresponding to M reaction vessels, after $\beta$ ($\beta$ is an integer>2) cycles, the reaction disk 1 moves by an amount of $\alpha$ ($\alpha$ is an integer>1) rotation±one reaction vessel, and $\beta \times M = \alpha \times N \pm 1$ is established. Specifically, when N=28, M=17, $\alpha$=3, and $\beta$=5, $5 \times 17 = 3 \times 28 - 1 = 84$, and when one reaction vessel is focused on, the reaction vessel moves to an adjacent stop position after 5 cycles.

In FIG. 2A, numbers shown in parentheses on an outer peripheral side of the reaction disk 1, that is, [1] to [28] indicates stop positions at which the reaction vessel 2 (the reaction vessel 2-1 in this example), in which the sample is dispensed at the sample discharge position 41 by the sample dispensing mechanism 11, is stopped in a cycle [1] to a cycle [28] using the cycle in which the sample is dispensed as the cycle [1]. As described above, the reaction vessel 2 stops at a position 17 reaction vessels away in a clockwise direction each time one cycle is added.

Herein, the position at which a predetermined process is performed on the reaction vessel 2 is determined by an arrangement position of a mechanism of the automated analyzer 100. As shown in FIG. 2A, in addition to the sample discharge position 41 where the sample is dispensed into the reaction vessel 2 described above, a sample sucking position 42 where a pretreated (for example, diluted) sample is sucked from the reaction vessel 2 by the sample dispensing mechanism 11, a first reagent dispensing position 43 by the reagent dispensing mechanism 7, a second reagent dispensing position 44 by the reagent dispensing mechanism 7, a first stirring position 45 where a reaction solution, which is a mixture of a sample and a first reagent in the reaction vessel 2 after the first reagent is discharged, is stirred by the stirring mechanism 5, a second stirring position 46 where a reaction solution, which is a mixture of the sample, the first reagent and a second reagent in the reaction vessel 2 after the second reagent is discharged, is stirred by the stirring mechanism 5, and an absorbance measurement position 47 by the spectrophotometer serving as the measurement unit 4 for measuring the absorbance of the reaction solution are arranged, respectively. FIG. 2B is a diagram showing that the reaction disk 1 of FIG. 2A is extracted. Numbers shown on an inner periphery of the reaction disk 1 define a reaction vessel stop position in a clockwise direction with the reaction vessel stop position which is the sample discharge position 41 serving as a reaction vessel position number 1.

As shown in FIGS. 2A and 2B, when the reaction vessel 2-1 is focused on, in the cycle [1], at the sample discharge position (reaction vessel position number 1), a predetermined amount of sample is dispensed from the sample vessel 15 or the sample sucking position 42 to the reaction vessel 2-1 by the sample dispensing mechanism 11. Next, in a cycle [2], at the first reagent dispensing position 43 (reaction vessel position number 18), a predetermined amount of first reagent is dispensed to the reaction vessel 2-1 to which the predetermined amount of sample is already dispensed, by the reagent dispensing mechanism 7. In a cycle [3], the reaction vessel 2-1 storing a reaction solution which is a mixture of the sample and the first reagent passes through the absorbance measurement position 47 while the reaction vessel 2-1 moves to the first stirring position 45 (reaction vessel position number 7). At this time, the absorbance is measured by the spectrophotometer serving as the measurement unit 4. At the first stirring position 45 (reaction vessel position number 7), the reaction solution which is the mixture of the sample and the first reagent in the reaction vessel 2-1 is stirred and mixed by the stirring mechanism 5. Next, in a cycle [4], the reaction vessel 2-1 moves to a reaction vessel position number 24. At this time, when the reaction vessel 2-1 passes through the absorbance measurement position 47, the absorbance is measured by the spectrophotometer serving as the measurement unit 4. In a cycle [6], the reaction vessel 2-1 moves to the sample sucking position (reaction vessel position number 2) and stops. During this period, the absorbance is also measured by the spectrophotometer serving as the measurement unit 4 when the reaction vessel 2-1 passes through the absorbance measurement position 47. Thereafter, the reaction vessel 2-1 moves sequentially until the 28th cycle, and the reaction vessel 2-1 is cleaned by the washing mechanism 3 at a reaction vessel position number 12 in the cycle [28]. Thereafter, the reaction vessel 2-1 moves again to the reaction vessel position number 1 which is the sample discharge position 41.

FIG. 3 shows an example of an operation timing chart of the reaction disk 1, the washing mechanism 3, the measurement unit 4, the sample dispensing mechanism 11, the reagent dispensing mechanism 7, and the stirring mechanism 5 of the automated analyzer in one cycle. A cycle time of one cycle is 33 seconds. One cycle includes a stopping period and a rotation period of the reaction disk 1. In the cycle [1], while the reaction disk 1 is stopped, the washing mechanism 3 washes reaction vessels 2-11 and 2-12, the sample dispensing mechanism 11 dispenses the sample into the reaction vessel 2-1, the reagent dispensing mechanism 7 dispenses the first reagent in the reaction vessel 2-18, and the stirring mechanism 5 stirs the first reagent dispensed into a reaction vessel 2-7. The reagent nozzle 7a of the reagent dispensing mechanism 7 is cleaned in the cleaning tank 13 after dispensing the first reagent (not shown). Further, the spatula-shaped rod of the stirring mechanism 5 is cleaned in the cleaning tank 32 after the stirring mechanism 5 stirs the first reagent (not shown). Thereafter, the reagent dispensing mechanism 7 dispenses the second reagent into a reaction vessel 2-20, and the stirring mechanism 5 stirs the second reagent dispensed into a reaction vessel 2-9. After all the operations are completed, the reaction disk 1 rotates by an amount of 17 reaction vessels 2 in a clockwise direction. During this period, the measurement unit 4 measures the absorbance of the reaction vessel 2 which is passed through. After the rotation operation of the reaction disk 1 and the absorbance measurement of the measurement unit 4 are completed, the automated analyzer 100 proceeds to a next cycle.

In FIG. 4, the cycles [1] to [28] are plotted on a horizontal axis, and an analysis step to be performed on a certain reaction vessel 2 in each cycle is shown. The sample is dispensed in the cycle [1], then the reagent is dispensed and stirred, and a reaction between the sample and the reagent is measured until a cycle [18]. The section is referred to as a reaction solution measurement section. Therefore, the reaction vessel can be cleaned from a cycle [19] to the cycle [28], and in an installation example of the washing mechanism 3 in FIG. 2, the cleaning of the reaction vessel is performed in the cycles [23] and [28] as described above.

Herein, when the analysis is started, and the reaction vessel used first is assumed to be the reaction vessel 2-1 shown in FIG. 2A, the reaction disk 1 moves the reaction vessel 2-1 to a reaction vessel position number 11 in FIG. 2B, and the cleaning is started from reaction vessel cleaning of the cycle [23] shown in FIG. 4. Even in six cycles from when the analysis is started to when the cleaning of the reaction vessel 2-1 is performed from the cycle [23] to the cycle [28] until the cycle [1], when the reaction vessel cleaning is performed according to the analysis timing shown in FIG. 3, it takes three minutes 18 seconds (198 seconds=6 cycles×33 seconds) until the reaction vessel 2-1 reaches the sample discharge position 41 and the sample dispensing mechanism 11 is in a state capable of discharging the sample. As described above, since the reaction solution measurement section in FIG. 4 has 18 cycles (=9 minutes and 54 seconds), as a result, a first measurement result cannot be obtained unless 13 minutes 12 seconds has elapsed since the start of the analysis. In particular, the sample dispensing mechanism 11, the reagent dispensing mechanism 7, and the stirring mechanism 5 are in a stopped state because there is no reaction vessel 2 into which the sample can be dispensed in 3 minutes and 18 seconds from the start of the analysis, and therefore there is no sample that requires reagent discharging and stirring and there is no reaction vessel 2 in which the reagent is already discharged. The absorbance measurement is not performed in the section where there is no measurement target for the measurement unit 4 (when water is dispensed into the reaction vessel 2 by the washing mechanism 3 or the like and there is a function of measuring a reference absorbance of the reaction vessel when passing through the measurement unit 4, the absorbance measurement may be performed from an end of a cleaning section). That is, during the 6 cycles from the start of the analysis, in the analysis timing chart shown in FIG. 3, after the washing mechanism 3 washes the reaction vessel at a beginning of the stop time of the reaction disk 1, there is substantially wasted idle time, which hinders reducing of a turnaround time (TAT).

A method for reducing the TAT in the first embodiment is shown in FIG. 5. An analysis cycle 501 is the same as FIG. 3, and an analysis cycle 502 is a timing chart when only the cleaning of the reaction vessel 2 is performed by the washing mechanism 3 in the analysis cycle 501. In the analysis cycle 502, the reducing of the TAT is hindered as described above. On the other hand, a washing cycle 503 is defined as a cycle in which only the cleaning of the reaction vessel 2 is performed by the washing mechanism 3 and the rotation of the reaction disk 1 is started skipping the time during which the reaction disk 1 is stopped for the operations of the sample dispensing mechanism 11, the reagent dispensing mechanism 7, and the stirring mechanisms. Accordingly, since the idle time can be reduced, the cycle time of the washing cycle can be shortened compared to the analysis cycle, and in the example of FIG. 5, one washing cycle is set to 16.5 seconds with respect to 33.0 seconds of one analysis cycle. The washing cycle can be applied without affecting a measurement result in a time zone in which the cyclic absorbance measurement by the measurement unit 4 is not required. That is, in the analysis of the biological sample, the cycle time cannot be changed because the cyclic absorbance measurement is ensured by the reaction vessel passing through the absorbance measurement position 47 once every two cycles (2 cycles×33 seconds), whereas there is no problem for the washing cycle because the washing cycle is a cycle before the sample is discharged.

For example, when the analysis is started and the reaction vessel used first is assumed to be the reaction vessel 2-1 shown in FIG. 2A, the reaction disk 1 moves the reaction vessel 2-1 to the reaction vessel position number 11 in FIG. 2B, and the cleaning is started from the reaction vessel cleaning of the cycle [23] shown in FIG. 4. In this case, in the six cycles from when the analysis is started to when the cleaning of the reaction vessel 2-1 is performed from the cycle [23] to the cycle [28] until the cycle [1], the washing cycle 503 can be applied. As a result, it takes 1 minute 39 seconds (99 seconds=6 cycles×16.5 seconds) until the reaction vessel 2-1 reaches the sample discharge position 41 and the sample dispensing mechanism 11 is in a state capable of discharging the sample, so that waiting time until the sample is discharged can be halved. As described above, since the reaction solution measurement section in FIG. 4 has 18 cycles (9 minutes and 54 seconds), the first measurement result can be obtained in 11 minutes and 33 seconds from the start of the analysis.

Further, the washing cycle 503 is also effective in reducing a time from when the measurements of all the sample vessels 15 are completed to when the reaction vessel is cleaned, the analysis is completed, and the device is stopped. In the example in FIG. 4, the measurement of a last reaction vessel 2 is completed in the cycle [18], and it is necessary to wash the last reaction vessel 2 in the cycles [19] to [28] and completes the analysis. When the cleaning of the reaction vessel 2 is performed in the analysis cycle (only a cleaning operation) 502, it takes 5 minutes and 30 seconds (330 seconds=10 cycles×33 seconds) from when the cleaning is completed, the analysis is completed, and the device is stopped. On the other hand, the time can be reduced to 2 minutes and 45 seconds (165 seconds=10 cycles×16.5 seconds) by applying the washing cycle 503.

Further, the washing cycle 503 can also be applied to reduce a maintenance time in which all the reaction vessels 2 are cleaned immediately after the power supply of the device is turned on. For example, in order to clean the 28 reaction vessels 2 by the washing mechanism 3 in the analysis cycle (only the cleaning operation) 502 as shown in FIG. 2A, since cleaning operations of the cycle [23] and the cycle [28] are performed twice on one reaction vessel 2, a total of 33 cycles (=18 minutes and 9 seconds) are required, whereas the time required for the 33 cycles can be reduced to half of that by applying the washing cycle 503.

In the automated analyzer 100 that operates cyclically, in order to move the process to the analysis cycle 501 without idle time after the process from when the analysis is started to when the first reaction vessel 2 is in a state where the sample can be dispensed is operated in the washing cycle 503, it is desirable that the following relationship is established:

$$A \times B = k \times C$$

wherein A is the number of cycles required for the cleaning, B is a washing cycle time, C is an analysis cycle time, and k is an integer (>1).

For example, when the reaction vessel 2 used first from the start of the analysis is assumed to be the reaction vessel 2-1, the reaction disk 1 moves the reaction vessel 2-1 to the reaction vessel position number 11 shown in FIG. 2B, and the cleaning is started from the reaction vessel cleaning of the cycle [23] (see FIG. 4). Since six cycles from when the analysis is start to when the cleaning of the reaction vessel 2-1 is performed and the reaction vessel 2-1 reaches the sample discharge position 41 are required, when assuming that A=6, and as shown in FIG. 5, B=16.5 seconds in the washing cycle 503, and C=33 seconds in the analysis cycle 501, the relationship of $A \times B = k \times C$ is established at k=3. That is, $A \times B$ corresponds to the cleaning time of the washing cycle, which is an integral multiple of the analysis cycle time C. Since the controller 21 of the automated analyzer 100 manages the cycle from the start of the analysis in accordance with the analysis cycle 501, it is possible to switch to the analysis cycle without the idle time after a predetermined washing cycle is completed.

In the embodiment, examples of two steps are shown as the cleaning steps, whereas the invention is not limited thereto. When a washing mechanism capable of performing first to m-th cleaning steps is provided for each of m (m is an integer) reaction vessels, a cycle including the cleaning steps of the m steps can be implemented. Also in this case, when the number of cycles required for the cleaning in the m steps is set to A, it is desirable to set the relationship described above to be established.

As described above, according to the first embodiment, it is possible to provide an automated analyzer having a short TAT by, for example, reducing the cleaning time without additionally providing the washing mechanism 3.

Second Embodiment

Figure 7:
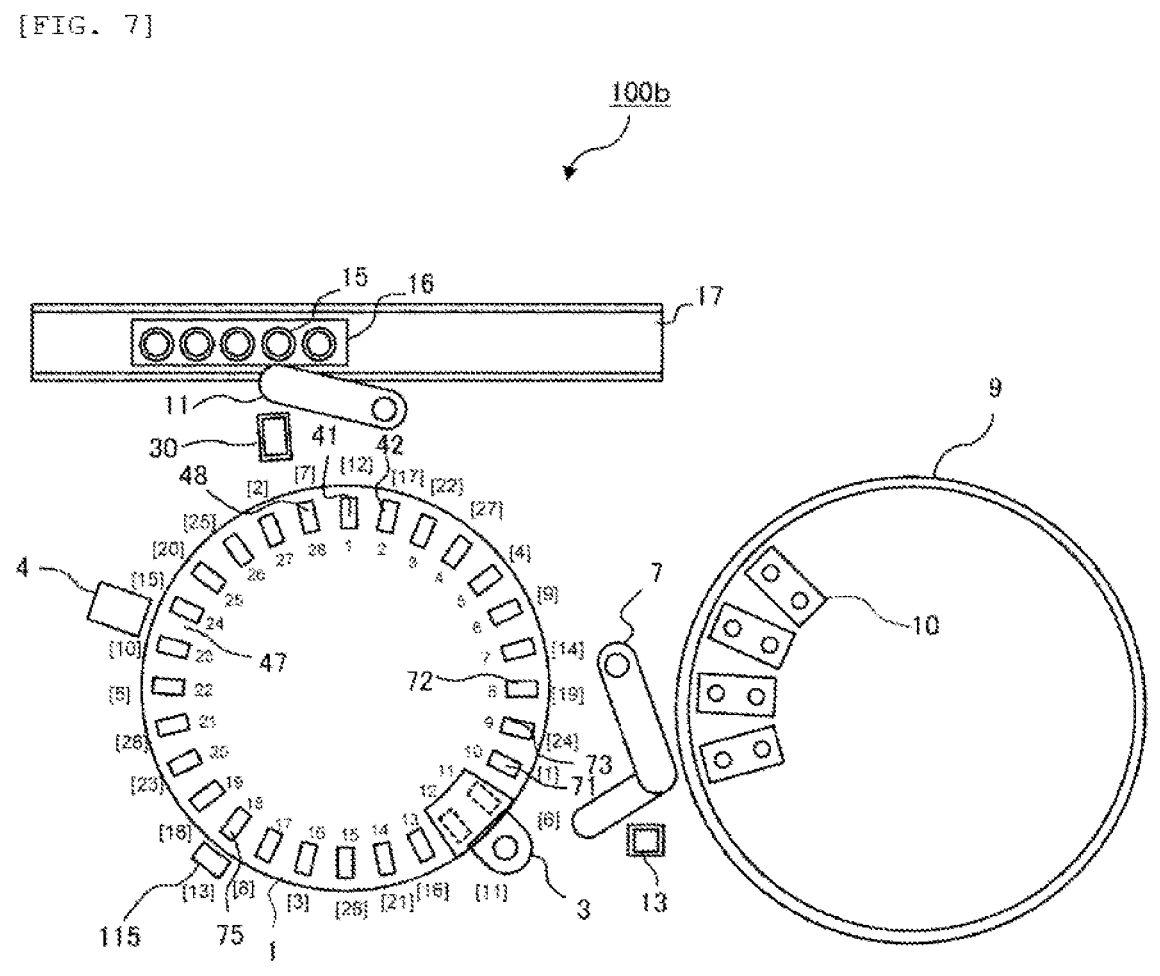

A second embodiment has an analysis cycle different from that of the first embodiment. An analysis cycle in an automated analyzer 100b of the second embodiment will be described with reference to FIGS. 6 to 8. In the second embodiment, similarly to the first embodiment, 28 reaction vessels 2-1 to 2-28 are also accommodated in the reaction disk 1, and the reaction disk 1 repeatedly rotates by an amount of 17 reaction vessels 2 and stops in one cycle in a clockwise direction.

In the second embodiment, one cycle includes a plurality of stopping periods and a plurality of rotation periods. Specifically, as shown in an analysis cycle 1001 shown in FIG. 10, the stopping period and the rotation period are repeated three times. FIG. 6 shows a state where the reaction vessel 2-1 is located at the sample discharge position 41 in a first stopping period 1010. Herein, on an outer periphery of the reaction disk 1, stop positions are shown at which the reaction vessel 2-1 in which the sample is dispensed at the sample discharge position 41 by the sample dispensing mechanism 11 in the stopping period 1010 of the cycle [1], is stopped in the stopping periods 1010 of the cycle [1] to the cycle [28]. Further, similarly to FIG. 2B, numbers shown on an inner periphery of the reaction disk 1 define reaction vessel stop positions in a clockwise direction with the reaction vessel stop position which is the sample discharge position 41 serving as the reaction vessel position number 1.

From this state, the reaction disk 1 moves by an amount of 9 reaction vessels 2 in a clockwise direction and then stops. The state (a second stopping period 1011) is shown in FIG. 7. In FIG. 7, on the outer periphery of the reaction disk 1, stop positions are shown at which the reaction vessel 2-1, in which the sample is dispensed at the sample discharge position 41 by the sample dispensing mechanism 11 in the stopping period 1010 of the cycle [1], is stopped in the stopping periods 1011 of the cycle [1] to the cycle [28].

Thereafter, the reaction disk 1 moves by an amount of one reaction vessel 2 and then stops. The state (a third stopping period 1012) is shown in FIG. 8. In FIG. 8, on the outer periphery of the reaction disk 1, stop positions are shown at which the reaction vessel 2-1, in which the sample is dispensed at the sample discharge position 41 by the sample dispensing mechanism 11 in the stopping period 1010 of the cycle [1], is stopped in the stopping periods 1012 of the cycle [1] to the cycle [28].

Thereafter, the reaction disk 1 stops after moving by an amount of remaining seven reaction vessels, and the operation of one cycle is completed.

A basic configuration of the automated analyzer 100*b* of the second embodiment is similar to that of the first embodiment, and each mechanism is controlled by the controller 21. However, arrangement positions of the mechanisms are different from those of the first embodiment (the same arrangement as that of the first embodiment is denoted by the same reference numeral, and detailed description is omitted). Specifically, as shown in FIGS. 6 to 8, the sample discharge position 41 (reaction vessel position number 1) where the sample is dispensed (discharged) to reaction vessel 2, the sample sucking position 42 (reaction vessel position number 2) where a pretreated sample is sucked from the reaction vessel 2 by the sample dispensing mechanism 11, a first reagent dispensing position 71 (reaction vessel position number 10) by the reagent dispensing mechanism 7, a second reagent dispensing position 72 (reaction vessel position number 8) by the reagent dispensing mechanism 7, a third reagent dispensing position 73 (reaction vessel position number 9) by the reagent dispensing mechanism 7, a reagent stirring position 75 (reaction vessel position number 18) where the stirring is performed by a stirring mechanism 115, and the absorbance measurement position 47 by a spectrophotometer serving as the measurement unit 4 for measuring the absorbance of the reaction solution are arranged, respectively. The stirring mechanism 115 in the second embodiment has a fixed type in which the sample and the reagent in the reaction vessel are stirred by an acoustic wave oscillated by an ultrasonic element, and the stirring of the reaction solution can be performed only at the reagent stirring position 75.

In FIG. 9, cycles [1] to [28] are plotted on a horizontal axis, and an analysis step performed in each cycle is shown. In the second embodiment, the sample is dispensed in the cycle [1], then the reagent is dispensed and stirred, and a reaction between the sample and the reagent is measured until the cycle [18]. The section is a reaction solution measurement section, the reaction vessel can be cleaned in from the cycle [19] to the cycle [28], and in an installation example of the washing mechanism 3 in FIGS. 6 to 8, the cleaning of the reaction vessel is performed in the cycles [23] and [28].

The analysis cycle 1001 shown in FIG. 10 will be described with reference to the analysis step shown in FIG. 9.

In the stopping period 1010 of the cycle [1], the sample dispensing mechanism 11 sucks the sample from the sample vessel 15 or the sample sucking position 42 and discharges the sample to the reaction vessel 2-1 stopped at the sample discharge position 41 (FIG. 6). Thereafter, in the stopping period 1011 of the cycle [1], the reaction vessel 2-1 stops at the first reagent dispensing position 71 (FIG. 7). The reagent dispensing mechanism 7 collects a reagent from the reagent bottle 10 provided on the reagent disk 9 in a hanging manner and discharges the reagent to the reaction vessel 2-1 stopped at the first reagent dispensing position 71. Thereafter, in the stopping period 1012 of the cycle [1], the reaction vessel 2-1 stops at the reaction vessel position number 11 (FIG. 8), but the washing mechanism 3 does not operate during the stopping period. Thereafter, in the stopping period 1010 of the cycle [2], the reaction vessel 2-1 moves to the reagent stirring position 75, and the first reagent dispensed into the reaction vessel 2-1 is stirred by the stirring mechanism 115 (FIG. 6).

In the analysis cycle 1001, either one of the second reagent and a third reagent can be dispensed to the reaction solution of the sample and the first reagent.

When the second reagent is dispensed into the reaction vessel 2-1, in the stopping period 1010 of a cycle [8], the reaction vessel 2-1 stops at the second reagent dispensing position 72 (FIG. 6). The reagent dispensing mechanism 7 collects a reagent from the reagent bottle 10 provided on the reagent disk 9 in a hanging manner and discharges the reagent to the reaction vessel 2-1 stopped at the second reagent dispensing position 72. Thereafter, in the stopping period 1011 of the cycle [8], the reaction vessel 2-1 stops at a reaction vessel position number 17 (FIG. 7). Further, in the stopping period 1012 of the cycle [8], the reaction vessel 2-1 moves to the reagent stirring position 75, and the second reagent dispensed into the reaction vessel 2-1 is stirred by the stirring mechanism 115 (FIG. 8).

On the other hand, when the third reagent is dispensed into the reaction vessel 2-1, the reaction vessel 2-1 stops at the third reagent dispensing position 73 in the stopping period 1010 of a cycle [13] (FIG. 6). The reagent dispensing mechanism 7 collects the reagent from the reagent bottle 10 provided on the reagent disk 9 in a hanging manner and discharges the reagent to the reaction vessel 2-1 stopped at the third reagent dispensing position 73. Thereafter, in the stopping period 1011 of the cycle [13], the reaction vessel 2-1 moves to the reagent stirring position 75, and the third reagent dispensed into the reaction vessel 2-1 is stirred by the stirring mechanism 115 (FIG. 7). In the stopping period 1012 of the cycle [13], the reaction vessel 2-1 stops at a reaction vessel position number 19 (FIG. 8).

As shown in the analysis cycle 1001 of FIG. 10, the dispensing of the second reagent and the dispensing of the third reagent are selectively performed in the stopping period 1010. Therefore, when the second reagent is dispensed, the second reagent is stirred, and the third reagent is not stirred. Further, when the third reagent is dispensed, the third reagent is stirred, and the second reagent is not stirred. In addition, the cleaning of the reaction vessel by the washing mechanism 3 and the discharging of the sample by the sample dispensing mechanism 11 are performed only during the stopping period 1010. In addition, the absorbance measurement by the measurement unit 4 is performed in each of the three rotation periods.

In this way, a problem similar to the first embodiment also occurs in a mode in which the rotation period and the stopping period are repeated in one analysis cycle. That is, when the reaction vessel used first is assumed to be the reaction vessel 2-1, the reaction disk 1 moves the reaction vessel 2-1 to the reaction vessel position number 11 in FIG. 6, and the cleaning is started from the reaction vessel cleaning of the cycle [23] shown in FIG. 9. When the process is performed in the analysis cycle (only the cleaning operation) 1002 shown in FIG. 10, the reducing of the TAT is hindered. Therefore, a washing cycle 1003 in FIG. 10 is defined as a washing cycle in which only the cleaning of the reaction vessel 2 is performed by the washing mechanism 3 and the rotation of the reaction disk 1 is started skipping the idle time during which the reaction disk 1 is stopped for the sample dispensing mechanism 11, the reagent dispensing mechanism 7, and the stirring mechanism 115. Since the idle time can be reduced, the cycle time of the washing cycle can be shortened compared to the analysis cycle, and in the example of FIG. 10, one washing cycle is set to 16.5 seconds with respect to 33.0 seconds of one analysis cycle. The reaction disk 1 may be rotated by an amount of nine reaction vessels, one reaction vessel and seven reaction vessels without the idle time, or the reaction disk 1 may be operated by an amount of 17 reaction vessels one time. In the second embodiment, in order to move the process to the analysis cycle 1001 without the idle time after the process from when the analysis is started to when the first reaction vessel 2 is in a state where the sample can be dispensed is operated in the washing cycle 1003, it is also desirable that the following relationship is established:

$$A \times B = k \times C$$

wherein A is the number of cycles required for the cleaning, B is a washing cycle time, C is an analysis cycle time, and k is an integer (>1).

The washing cycle can be applied without affecting a measurement result in a time zone in which the cyclic absorbance measurement by the measurement unit 4 is not required, that is, a time zone form when the analysis is started, to when at least one reaction vessel used first is cleaned, or to when the reaction vessel 2 is cleaned, the analysis is completed, and the device is stopped after the measurements of all the sample vessels 15 are completed, or can be applied to reduce a maintenance time in which all the reaction vessels 2 are cleaned immediately after the power supply of the device is turned on. The time that can be reduced is similar to that of the first embodiment, and will be omitted.

In this way, the TAT can also be reduced in an automated analyzer that rotates the reaction disk 1 a plurality of times in one cycle.

As described above, the invention made by the present inventor has been specifically described based on the embodiments, but the invention is not limited to the description of the embodiments, and various changes may be made.

REFERENCE SIGN LIST 1 reaction disk
2 reaction vessel
3 washing mechanism
4 measurement unit
5 stirring mechanism
7 reagent dispensing mechanism
7a reagent nozzle
9 reagent disk
10 reagent bottle
11 sample dispensing mechanism
11a sample nozzle
13 cleaning tank
15 sample vessel
16 rack
17 sample transport mechanism
18a reagent pump
18c sample pump
20 cleaning pump
21 controller
22 vacuum pump
30, 32 cleaning tank
41 sample discharge position
42 sample sucking position
43 first reagent dispensing position
44 second reagent dispensing position
45 first stirring position
46 second stirring position
47 absorbance measurement position
71 first reagent dispensing position
72 second reagent dispensing position
73 third reagent dispensing position
75 reagent stirring position
100, 100b automated analyzer
115 stirring mechanism
501, 1001 analysis cycle
502, 1002 analysis cycle (only the cleaning operation)
503, 1003 washing cycle
1010, 1011, 1012 stopping period

The invention claimed is:

1. An automated analyzer, comprising:
   a reaction disk that circumferentially accommodates a plurality of reaction vessels;
   a sample dispensing mechanism that dispenses a predetermined amount of a sample into a reaction vessel of the plurality of reaction vessels;
   a reagent dispensing mechanism that dispenses a predetermined amount of a reagent into the reaction vessel;
   a stirring mechanism that stirs the sample and the reagent dispensed into the reaction vessel;
   a measurement unit that performs a measurement of a mixture of the sample and the reagent in the reaction vessel in a reaction process and/or a reaction solution after the reaction;
   a washing mechanism that cleans the reaction vessel; and
   a controller that controls the measurement unit to perform an analysis cycle of the automated analyzer, the analysis cycle including a first rotation period of the reaction disk, during which the measurement unit performs the measurement, and a continuous first non-rotation period of the reaction disk, during which the reaction disk is stopped and the washing mechanism cleans the reaction vessel, wherein
   the controller controls the washing mechanism to perform a washing cycle including a continuous second non-rotation period of the reaction disk, during which the reaction disk is stopped and the washing mechanism cleans the reaction vessel, and a second rotation period of the reaction disk,
   during the washing cycle the sample dispensing mechanism, the reagent dispensing mechanism, and the stirring mechanism do not operate, and
   the washing mechanism operates during the second non-rotation period while the reaction disk is stopped at a time before or after performing the analysis cycle,
   the second non-rotation period during which the reaction disk is stopped during the washing cycle of the reaction vessel is shorter than the first non-rotation period during which the reaction disk is stopped during the analysis cycle of the reaction vessel, and
   a rotation amount of the reaction disk in the first rotation period of the analysis cycle is equal to a rotation amount of the reaction disk in the second rotation period of the washing cycle.

2. The automated analyzer according to claim 1, wherein the washing mechanism performs a cleaning step on each of m reaction vessels of the plurality of reaction vessels in the analysis cycle or the washing cycle, where m is an integer greater than zero.

3. The automated analyzer according to claim 2, wherein
a cycle time of the analysis cycle is defined as a time between a first time that the sample dispensing mechanism dispenses the sample for measurement into the reaction vessel of the plurality of reaction vessels and a second time that the sample dispensing mechanism dispenses another sample for measurement into a next reaction vessel of the plurality of reaction vessels after the reaction disk rotates and stops; and a total length of time of the first to m-th cleaning steps is an integer multiple of the cycle time of the analysis cycle.

4. The automated analyzer according to claim 1, wherein the analysis cycle includes a plurality of first rotation periods including the first rotation period and a plurality of first non-rotation periods including the first non-rotation period.

5. The automated analyzer according to claim 1, wherein the controller is configured to control the washing mechanism to perform cleaning of the reaction vessel in the washing cycle until a cleaning step performed by the washing mechanism on another reaction vessel of the plurality of reaction vessels in which the sample that was previously discharged by the sample dispensing mechanism is completed.

6. The automated analyzer according to claim 1, wherein the controller is configured to control the washing mechanism to perform the cleaning of the reaction vessel in the washing cycle after a reaction solution measurement is performed on all the reaction vessels mounted on the reaction disk.

7. The automated analyzer according to claim 1, wherein in response to a power supply of the automated analyzer being turned on, the controller controls the washing mechanism to perform the washing cycle on each of the plurality of reaction vessels without performing the analysis cycle.

8. The automated analyzer according to claim 1, wherein the reaction vessel, stopping at a predetermined position of the reaction disk, stops at a position adjacent to the predetermined position after a predetermined plurality of analysis cycles and/or washing cycles.

9. The automated analyzer according to claim 8, wherein the controller is configured to rotate the reaction disk such that the reaction disk moves by an amount of $\alpha$ ($\alpha$ is an integer greater than 1) rotations ±one reaction vessel after $\beta$ ($\beta$ is an integer greater than 2) analysis cycles and/or washing cycles of the plurality of analysis cycles and/or washing cycles.

10. The automated analyzer according to claim 9, wherein when the total number of the reaction vessels accommodated in the reaction disk is set to N and the rotation amount of the reaction disk in one cycle of the plurality of analysis cycles and/or washing cycles is set to an amount of M reaction vessels, a relation $\beta \times M = \alpha \times N \pm 1$ is established.

11. The automated analyzer according to claim 1, wherein a duration of the second non-rotation period in the washing cycle is equal to a duration of operating the washing mechanism.

12. The automated analyzer according to claim 1, further comprising a reagent disk, wherein the measurement unit is disposed between the reaction disk and the reagent disk.

13. The automated analyzer according to claim 1, wherein the measurement unit and the sample dispensing mechanism are disposed on a side of the reaction disk opposite from a the washing mechanism.

14. The automated analyzer according to claim 3, wherein the cycle time of the analysis cycle is equal to an integer multiple of a cycle time of the washing cycle, wherein the integer multiple is at least two.

* * * * *